United States Patent
Fu et al.

(10) Patent No.: US 12,087,914 B2
(45) Date of Patent: Sep. 10, 2024

(54) WOUND-TYPE CELL AND PREPARATION METHOD THEREOF, BATTERY AND ELECTRONIC PRODUCT

(71) Applicant: Zhuhai CosMX Battery Co., Ltd., Zhuhai (CN)

(72) Inventors: Xiaohu Fu, Zhuhai (CN); Tengfei Xu, Zhuhai (CN)

(73) Assignee: ZHUHAI COSMX BATTERY CO., LTD. (CN)

( * ) Notice: Subject to any disclaimer, the term of this patent is extended or adjusted under 35 U.S.C. 154(b) by 0 days.

(21) Appl. No.: 17/119,335

(22) Filed: Dec. 11, 2020

(65) Prior Publication Data

US 2021/0351440 A1 Nov. 11, 2021

(30) Foreign Application Priority Data

May 11, 2020 (CN) .......................... 202010393415.5

(51) Int. Cl.
*H01M 10/00* (2006.01)
*H01M 4/13* (2010.01)
(Continued)

(52) U.S. Cl.
CPC ......... *H01M 10/0587* (2013.01); *H01M 4/13* (2013.01); *H01M 50/417* (2021.01); *H01M 50/449* (2021.01); *H01M 50/531* (2021.01)

(58) Field of Classification Search
CPC .. H01M 10/0587; H01M 4/13; H01M 50/417; H01M 50/449; H01M 50/531;
(Continued)

(56) References Cited

U.S. PATENT DOCUMENTS

| 10,411,243 B2 * | 9/2019 | Tsuji | ................... H01M 50/133 |
| 2006/0093922 A1 * | 5/2006 | Kim | ..................... H01M 50/571 |
| | | | 429/251 |

(Continued)

FOREIGN PATENT DOCUMENTS

| CN | 104157914 A | 11/2014 |
| CN | 204809314 U | 11/2015 |

(Continued)

OTHER PUBLICATIONS

Machine translation of CN 110676431 A, obtained Feb. 2023 (Year: 2020).*

(Continued)

*Primary Examiner* — Nicholas P D'Aniello
(74) *Attorney, Agent, or Firm* — Dilworth IP, LLC

(57) ABSTRACT

The present disclosure provides a wound-type cell and a preparation method thereof, a battery, and an electronic product. The wound-type cell includes a positive sheet, a negative sheet, and an insulated separator located between the positive sheet and the negative sheet; the negative sheet includes a negative base layer, a negative coating, and a negative tab set on the surface of the negative base layer. The negative coating covers surface of the negative base layer, and the negative coating has a tab connection area that avoids the negative tab. The negative tab is located in the tab connection area; the insulated separator between the tab connection area and the positive sheet is provided with a barrier layer covering the tab connection area. The provided solutions are helpful to reduce safety risks caused by lithium-plating during the fast charging of lithium ion battery.

5 Claims, 4 Drawing Sheets

(51) Int. Cl.
*H01M 10/0587* (2010.01)
*H01M 50/417* (2021.01)
*H01M 50/449* (2021.01)
*H01M 50/531* (2021.01)

(58) Field of Classification Search
CPC ............ H01M 10/052; H01M 50/572; H01M 10/0525; Y02P 70/50; Y02E 60/10
See application file for complete search history.

(56) References Cited

U.S. PATENT DOCUMENTS

| | | | | |
|---|---|---|---|---|
| 2012/0156564 | A1* | 6/2012 | Kim | C09J 7/22 429/211 |
| 2012/0177963 | A1* | 7/2012 | Lee | H01M 10/052 429/94 |
| 2019/0097228 | A1* | 3/2019 | Kobayashi | H01M 4/75 |
| 2019/0140241 | A1* | 5/2019 | Takahashi | B60L 50/64 |

FOREIGN PATENT DOCUMENTS

| | | |
|---|---|---|
| CN | 105161673 A | 12/2015 |
| CN | 205159450 U | 4/2016 |
| CN | 205828573 U * | 12/2016 |
| CN | 107834014 A | 3/2018 |
| CN | 110148777 A | 8/2019 |
| CN | 110429328 A | 11/2019 |
| CN | 110676431 A | 1/2020 |
| CN | 110729447 A | 1/2020 |
| CN | 111554982 A | 8/2020 |
| CN | 211980765 U | 11/2020 |
| CN | 212113885 U | 12/2020 |
| JP | H11307128 A | 11/1999 |
| JP | 2003068271 A | 3/2003 |
| JP | 2006093147 A | 4/2006 |
| JP | 2007165224 A | 6/2007 |
| JP | 2010055906 A | 3/2010 |
| WO | 2016197382 A1 | 12/2016 |
| WO | 2017047353 A1 | 3/2017 |
| WO | 2017163933 A1 | 9/2017 |

OTHER PUBLICATIONS

Machine translation of CN-205828573-U obtained Dec. 2023 (Year: 2016).*
Office Action from related Chinese Application No. 202010393415.5 dated Jan. 11, 2021, 16 pages, in Chinese language.
European Search Report in EP Patent Application No. 20214364.2 dated Jun. 8, 2021.
Second Office Action in CN Patent Application No. 202010393415.5 dated May 10, 2021.
International Search Report in International Application No. PCT/CN2021/091517 dated Jul. 30, 2021.
First Office Action in JP Patent Application No. 2022-569200 dated Dec. 14, 2023.

* cited by examiner

WOUND-TYPE CELL AND PREPARATION METHOD THEREOF, BATTERY AND ELECTRONIC PRODUCT

CROSS-REFERENCE TO RELATED APPLICATION

This application claims priority to Chinese Patent Application No. 202010393415.5, filed on May 11, 2020, which is hereby incorporated by reference in its entirety.

TECHNICAL FIELD

The present disclosure relates to the technical field of lithium batteries and, in particular, to a wound-type cell and a preparation method thereof, a battery and an electronic product.

BACKGROUND

With the development of science and technology, more and more electronic products enter into various aspects of people's lives, and the normal use of electronic products is inseparable from batteries. Among them, the lithium ion battery has been widely used in electronic products in various fields due to the advantages of high energy density and environmental friendliness. With the development of electric vehicle technology, the application of lithium ion battery in the field of electric vehicles has also attracted attention.

With the application of the lithium ion battery more and more widely, users have higher requirements for charging speed and endurance performance of the lithium ion battery. Therefore, fast charging technology has become one of the important development directions of the lithium ion battery.

At present, the lithium ion battery with wound-type cell will undergo lithium-plating during fast charging, which may cause thermal runaway of lithium ion battery and cause safety accidents. Therefore, how to reduce safety risks caused by the lithium-plating during fast charging of lithium ion battery has become a common concern of designers.

SUMMARY

The present disclosure provides a wound-type cell and a preparation method thereof, a battery and an electronic product. The wound-type cell can avoid metal lithium plating and attaching to uncoated area near a negative tab during fast charging of the battery, and thus is helpful to reduce safety risks caused by lithium-plating during the fast charging of lithium ion battery.

In a first aspect, the present disclosure provides a wound-type cell, including a positive sheet, a negative sheet, and an insulated separator between the positive sheet and the negative sheet; where, the negative sheet includes a negative base layer, a negative coating, and a negative tab disposed on surface of the negative base layer, where the negative coating covers the surface of the negative base layer, and the negative coating is provided with a tab connection area that avoids the negative tab, and the negative tab is located in the tab connection area; the insulated separator between the tab connection area and the positive sheet is provided with a barrier layer covering the tab connection area, and the barrier layer is used to prevent lithium-ions from passing through.

The wound-type cell of the present disclosure includes the positive sheet, the negative sheet, and the insulated separator located between the positive sheet and the negative sheet; the insulated separator is used to ensure mutual insulation between the positive sheet and the negative sheet; the negative sheet includes the negative base layer, the negative coating, and the negative tab disposed on the surface of the negative base layer; the negative coating covers the surface of the negative base layer, and the negative coating is provided with the tab connection area that avoids the negative tab; the negative tab disposed on the surface of the negative base layer is located in the tab connection area; the insulated separator between the tab connection area and the positive sheet is provided with the barrier layer that blocks the passage of lithium-ions, and the barrier layer covers the tab connection area, that is, the size of the barrier layer is larger than that of the tab connection area, so that the tab connection area can be completely covered, and thus it can prevent the lithium-ions of the positive sheet from passing through the barrier layer into the tab connection area, so as to prevent the lithium-ions from metal lithium plating and attaching to the negative base layer in the tab connection area. It is helpful to prevent safety accidents caused by thermal runaway of the lithium ion battery, and thus is helpful to reduce the safety risks caused by the metal lithium plating in fast charging process of the lithium ion battery.

For the wound-type cell as described above, in an implementation, the barrier layer is located on a side of the insulated separator facing the negative sheet; and/or, the barrier layer is located on a side of the insulated separator facing the positive sheet.

For the wound-type cell as described above, in an implementation, the barrier layer is bonded to the insulated separator through a first adhesive layer, where the first adhesive layer is a non-sticky hot melt adhesive layer at room temperature.

For the wound-type cell as described above, in an implementation, a second adhesive layer is provided on a side of the barrier layer facing away from the insulated separator, and the second adhesive layer is a pressure-sensitive adhesive layer that can be swelled by electrolyte.

For the wound-type cell as described above, in an implementation, the barrier layer is attached to surface of the insulated separator by spraying.

For the wound-type cell as described above, in an implementation, the barrier layer includes polyester resin; and/or, a thickness of the barrier layer is between 10 μm and 20 μm.

For the wound-type cell as described above, in an implementation, the insulated separator is selected from polyethylene or polypropylene; and a portion of the insulated separator covering the tab connection area is heated to form the barrier layer.

For the wound-type cell as described above, in an implementation, the positive sheet includes a positive base layer and a positive coating, the positive coating covers surface of the positive base layer, and the positive base layer is provided with an uncoated area; and the uncoated area is opposite to the tab connection area.

In a second aspect, the present disclosure provides a method for preparing a wound-type cell, including: providing a positive sheet, a barrier layer, a negative sheet, and an insulated separator, where the negative sheet includes a negative base layer, a negative coating, and a negative tab set on surface of the negative base layer, the negative coating covers the surface of the negative base layer, the negative coating is provided with a tab connection area that avoids the negative tab, and the negative tab is located in the tab connection area; providing a first adhesive layer on one side of the barrier layer, and providing a second adhesive layer on the other side of the barrier layer, and the first adhesive layer is a non-sticky hot melt adhesive layer at room temperature; bonding one side of the barrier layer with the second adhesive layer to a preset position of the positive sheet; stacking the insulated separator and the negative sheet sequentially on a side of the positive sheet where the barrier layer is bonded to, where the tab connection area faces the insulated separator; winding the above laminated structure to form the wound-type cell, so that the barrier layer covers the tab connection area, and the barrier layer is used to block lithium-ions from passing through; and thermally pressing the wound-type cell, so that the side of the barrier layer provided with the first adhesive layer is bonded to the insulated separator.

According to the preparation method of the wound-type cell in the present disclosure, by means of bonding the side of the barrier layer provided with the second adhesive layer to the preset position of the positive sheet, and stacking the side of the positive sheet where the barrier layer is bonded to with the insulated separator and the negative sheet sequentially, and winding the laminated structure to form a wound-type cell, the barrier layer in the wound-type cell can cover the tab connection area, and thus it can prevent the lithium-ions of the positive sheet from passing through the barrier layer into the tab connection area, so as to prevent the lithium-ions from metal lithium plating and attaching to the negative base layer in the tab connection area. Hot-pressing treatment on the wound-type cell can make a side of barrier layer provided with hot melt adhesive layer adhere with insulated separator, so as to avoid the barrier layer from shifting, thus it can be ensured that the barrier layer covers the tab connection area reliably.

In a third aspect, the present disclosure provides a battery, including a housing and the wound-type cell as described in any one of the above.

The battery of the present disclosure includes a housing and a wound-type cell, where the wound-type cell includes the positive sheet, the negative sheet, and the insulated separator located between the positive sheet and the negative sheet; the insulated separator is used to ensure mutual insulation between the positive sheet and the negative sheet; the negative sheet includes the negative base layer, the negative coating, and the negative tab disposed on the surface of the negative base layer; the negative coating covers the surface of the negative base layer, and the negative coating is provided with the tab connection area that avoids the negative tab; the negative tab disposed on the surface of the negative base layer is located in the tab connection area; the insulated separator between the tab connection area and the positive sheet is provided with the barrier layer that blocks the passage of lithium-ions, and the barrier layer covers the tab connection area, that is, the size of the barrier layer is larger than that of the tab connection area, so that the tab connection area can be completely covered, and thus it can prevent the lithium-ions of the positive sheet from passing through the barrier layer into the tab connection area, so as to prevent the lithium-ions from metal lithium plating and attaching to the negative base layer in the tab connection area. It is helpful to prevent safety accidents caused by thermal runaway of the lithium ion battery, and thus is helpful to reduce the safety risks caused by the metal lithium plating in fast charging process of the lithium ion battery.

In a fourth aspect, the present disclosure provides an electronic product, including a battery as described above.

The electronic product of the present disclosure includes a battery, and the battery includes a housing and a wound-type cell, where the wound-type cell includes the positive sheet, the negative sheet, and the insulated separator located between the positive sheet and the negative sheet; the insulated separator is used to ensure mutual insulation between the positive sheet and the negative sheet; the negative sheet includes the negative base layer, the negative coating, and the negative tab disposed on the surface of the negative base layer; the negative coating covers the surface of the negative base layer, and the negative coating is provided with the tab connection area that avoids the negative tab; the negative tab disposed on the surface of the negative base layer is located in the tab connection area; the insulated separator between the tab connection area and the positive sheet is provided with the barrier layer that blocks the passage of lithium-ions, and the barrier layer covers the tab connection area, that is, the size of the barrier layer is larger than that of the tab connection area, so that the tab connection area can be completely covered, and thus it can prevent the lithium-ions of the positive sheet from passing through the barrier layer into the tab connection area, so as to prevent the lithium-ions from metal lithium plating and attaching to the negative base layer in the tab connection area. It is helpful to prevent safety accidents caused by thermal runaway of the lithium ion battery, and thus is helpful to reduce the safety risks caused by the metal lithium plating in fast charging process of the lithium ion battery.

BRIEF DESCRIPTION OF DRAWINGS

In order to explain the embodiments of the present disclosure more clearly, the following will briefly introduce the drawings used in the description of the embodiments. Obviously, the drawings in the following description are some embodiments of the present disclosure. For those of ordinary skill in the prior art, other drawings can be obtained based on these drawings without creative labor.

DESCRIPTION OF REFERENCE SIGNS

1—positive sheet;
11—positive base layer;
12—positive coating;
13—uncoated area;
2—negative sheet;
21—negative base layer;
22—negative coating;
23—negative tab;
24—tab connection area;
3—insulated separator;
31—barrier layer.

DESCRIPTION OF EMBODIMENTS

Lithium ion battery with a wound-type cell usually adopts the mid-mount tab technology, that is, a specific process is used to remove coating on part of surface of electrode piece, and the tab is welded to bare base layer after the pole piece is removed. However, after the tab is welded to the base layer of the electrode piece, the exposed base layer is not completely covered, that is, there is still bare base layer around the tab.

Lithium ion battery will undergo lithium plating during fast charging. When the positive sheet, which is opposite to the exposed base layer on negative sheet, has an active coating, the lithium-ions from the active coating will pass through the separator between the positive sheet and the negative sheet and then the metal lithium plating exists on the bare base layer of the negative sheet, which may lead to thermal runaway of lithium ion battery and cause safety accidents.

In order to solve above technical problems, the present disclosure provides the wound-type cell. The wound-type cell is provided with a barrier layer covering a tab connection area between the tab connection area and the positive sheet. The barrier layer can block the lithium-ions of the positive sheet from passing through the barrier layer and entering the tab connection area, and thus it can prevent the lithium-ions from metal lithium plating and attaching to the negative base layer in the tab connection area, which may lead to safety accidents caused by thermal runaway of the lithium ion battery. Thus, the provided wound-type cell is helpful to reduce the safety risks caused by the metal lithium plating in fast charging process of the lithium ion battery.

In order to make the purpose, technical solutions, and advantages of embodiments of the present disclosure more clearly, the technical solutions in the embodiments of the present disclosure will be described clearly and completely in conjunction with the drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative effort shall fall within the protection scope of the present disclosure.

Embodiment I

Figure 1:
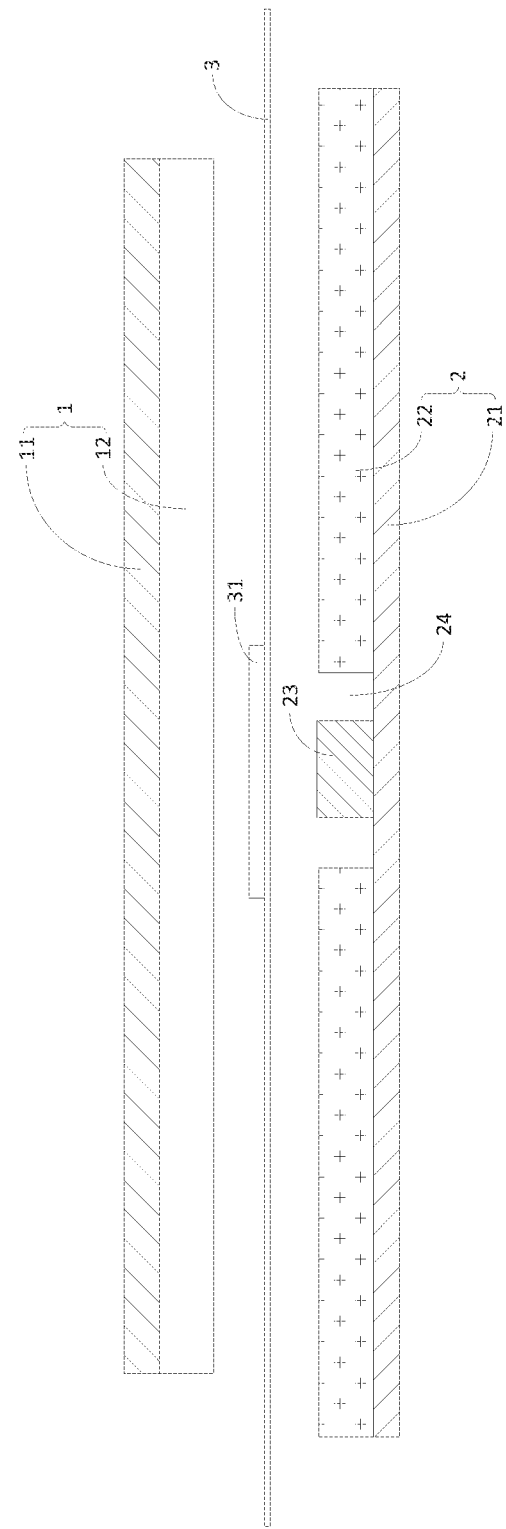
FIG. 1 is a partial schematic structural diagram of a wound-type cell provided by Embodiment I of the present disclosure.
Figure 2:
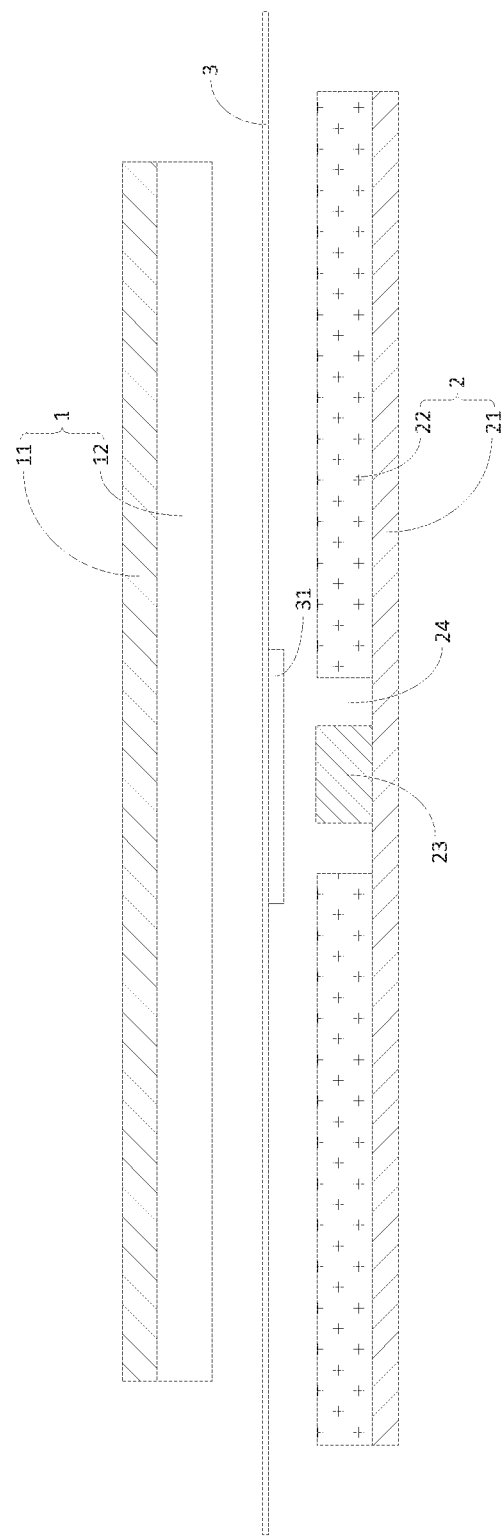
FIG. 2 is a partial schematic structure diagram of a wound-type cell provided by Embodiment I of the present disclosure.
Figure 3:
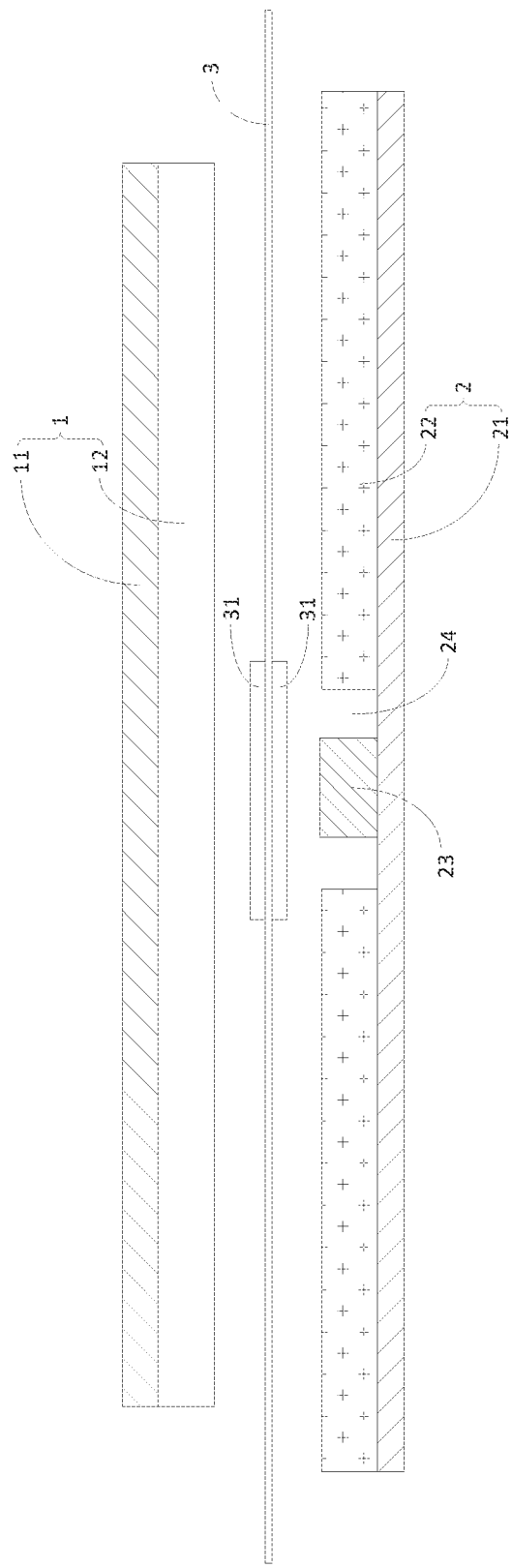
FIG. 3 is a partial schematic structure diagram of a wound-type cell provided by Embodiment I of the present disclosure.
Figure 4:
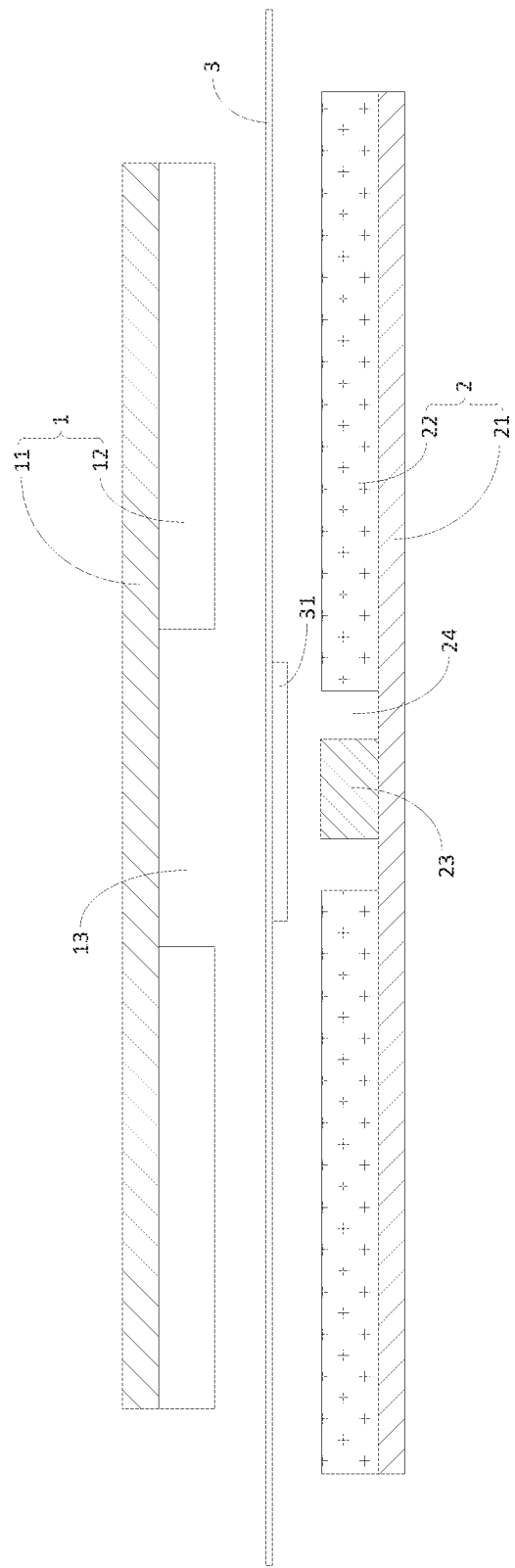
FIG. 4 is a partial schematic structure diagram of a wound-type cell provided by Embodiment I of the present disclosure.

FIG. 1 is a partial schematic structure diagram of a wound-type cell provided by Embodiment I of the present disclosure; FIG. 2 is a partial schematic structure diagram of a wound-type cell provided by Embodiment I of the present disclosure; FIG. 3 is a partial schematic structure diagram of a wound-type cell provided by Embodiment I of the present disclosure; FIG. 4 is a partial schematic structure diagram of a wound-type cell provided by Embodiment I of the present disclosure.

Referring to FIG. 1 to FIG. 4, this embodiment provides a wound-type cell that includes a positive sheet 1, a negative sheet 2, and an insulated separator 3 located between the positive sheet 1 and the negative sheet 2, where the insulated separator 3 can insulate the positive sheet 1 and the negative sheet 2 of the wound-type cell from each other, and the insulated separator 3 has pores for lithium-ions to pass through, thereby the normal operation of the lithium ion battery with the wound-type cell can be ensured.

Specifically, when the lithium ion battery is charged, the lithium-ions move out of the crystal lattice of the positive material and, along with the electrolyte, pass through the insulated separator and then insert into the crystal lattice of the negative material, so that the negative electrode is rich in lithium and the positive electrode is poor in lithium; when the lithium ion battery is discharged, the lithium-ions move out of the crystal lattice of the negative material and, along with the electrolyte, pass through the insulated separator and insert into the crystal lattice of the positive material, so that the positive electrode is rich in lithium and the negative electrode is poor in lithium.

The negative sheet 2 of this embodiment includes a negative base layer 21, a negative coating 22, and a negative tab 23 disposed on surface of the negative base layer 21. The negative tab 23 can be disposed on the surface of the negative base layer 21 by welding, or by other manners. Specifically, the negative coating 22 covers the surface of the negative base layer 21, and the negative coating 22 is provided with a tab connection area 24 that avoids the negative tab 23, that is, the surface of the negative base layer 21 located in the tab connection area 24 is not covered with the negative coating 22, and the negative tab 23 is located in the tab connection area 24.

Normally, in order to facilitate the setting of the negative tab 23 on the tab connection area 24 on the surface of the negative base layer, the area of the tab connection area 24 will be set to be larger than the area of the negative tab 23 located in the tab connection area 24, that is, the negative tab 23 provided in the tab connection area 24 will not completely cover the negative base layer 21 exposed on the tab connection area 24, resulting in the existence of exposed negative base layer 21 around the negative tab 23. During the cycle of the lithium ion battery, especially during the charging process of the lithium ion battery, the lithium-ions in the electrolyte may plate metal lithium on the surface of the negative base layer 21 exposed around the negative tab 23, and thus it may lead to safety accidents caused by thermal runaway of the lithium ion battery.

The insulated separator between the tab connection area 24 and the positive sheet 1 of this embodiment is provided with a barrier layer 31 covering the tab connection area 24. The barrier layer 31 can prevent the lithium-ions on the positive sheet 1, which is opposite to the tab connection area 24, from passing through the barrier layer 31 and entering the tab connection area 24, thereby preventing lithium-ions from metal lithium plating in the tab connection area 24 and attaching to the surface of the negative base layer 21 exposed around the negative tab 23, thus being beneficial to preventing safety accidents caused by thermal runaway of lithium ion battery.

It is understandable that setting the barrier layer 31 to cover the tab connection area 24 requires setting the size of the barrier layer 31 to be larger than the size of the tab connection area 24, so as to ensure that the barrier layer 31 completely covers the tab connection area 24 after the cell winding is completed, which prevents lithium-ions from entering the tab connection area 24.

In specific implementation, the wound-type cell of the lithium ion battery includes the positive sheet 1, the negative sheet 2, and the insulated separator 3 located between the positive sheet 1 and the negative sheet 2, and the negative sheet 2 includes the negative base layer 21 and the negative coating 22 covering the surface of the negative base layer, the surface of the negative base layer 21 is provided with a tab connection area 24 that is not covered by the negative coating 22, and the negative tab 23 is set on the surface of the negative base layer 21 of the tab connection area 24 to ensure that the wound-type cell can play a normal function in the lithium ion battery. In order to avoid that, during the charging process of the lithium ion battery, the lithium-ions detached from the positive sheet 1 located opposite to the tab connection area 24 enter the tab connection area 24 and lead to the metal lithium plating on the surface of the negative base layer 21, the barrier layer 31 can prevent the lithium-ions detaching from the positive sheet 1 from entering the tab connection area 24 to prevent the lithium-ions from metal lithium plating on the surface of the negative base layer 21 of the tab connection area 24. This helps prevent safety accidents caused by thermal runaway of the lithium ion battery, and thus it is helpful to reduce the safety risks caused by the metal lithium plating in fast charging process of the lithium ion battery.

The wound-type cell of this embodiment includes the positive sheet 1, the negative sheet 2, and the insulated separator 3 located between the positive sheet 1 and the negative sheet 2; the insulated separator 3 is used to ensure mutual insulation between the positive sheet 1 and the negative sheet 2; the negative sheet 2 includes the negative base layer 21, the negative coating 22, and the negative tab 23 disposed on the surface of the negative base layer 21, where the negative coating 22 covers the surface of the negative base layer 21, and the negative coating 22 is provided with the tab connection area 24 that avoids the negative tab 23, and the negative tab 23 disposed on the surface of the negative base layer 21 is located in the tab connection area 24; the insulated separator 3 between the tab connection area 24 and the positive sheet 1 is provided with the barrier layer 31 that blocks the passage of lithium-ions, and the barrier layer 31 covers the tab connection area 24, that is, the size of the barrier layer 31 is larger than that of the tab connection area 24, so that the tab connection area 24 can be completely covered, and thus it can prevent the lithium-ions of the positive sheet 1 from passing through the barrier layer 31 into the tab connection area 24, so as to prevent the lithium-ions from metal lithium plating and attaching to the negative base layer 21 in the tab connection area 24, it is helpful to prevent safety accidents caused by the thermal runaway of the lithium ion battery, and thus is helpful to reduce the safety risks caused by the metal lithium plating in fast charging process of the lithium ion battery.

Implementations of setting the barrier layer 31 covering tab connection area 24 between tab connection area 24 and positive sheet 1 include but are not limited to the following three feasible implementations:

In a first feasible implementation, as shown in FIG. 1, the barrier layer 31 is disposed on a surface of the insulated separator 3 facing the positive sheet 1. The lithium-ions detaching from the positive sheet 1 will be blocked by the barrier layer 31 before passing through the insulated separator 3, so that the lithium-ions cannot enter the tab connection area 24 through the barrier layer 31. Furthermore, it can prevent lithium-ions from metal lithium plating on the surface of negative base layer 21 of tab connection area 24, which may lead to safety accidents caused by thermal runaway of lithium ion battery.

In a second feasible implementation, as shown in FIG. 2, the barrier layer 31 is disposed on a surface of the insulated separator 3 facing the positive sheet 2. The lithium-ions detaching from the positive sheet 1 will be blocked by the barrier layer 31 before passing through the insulated separator 3, so that the lithium-ions cannot enter the tab connection area 24 through the barrier layer 31. Furthermore, it can prevent lithium-ions from metal lithium plating on the surface of negative base layer 21 of tab connection area 24, which may lead to safety accidents caused by thermal runaway of lithium ion battery.

In a third feasible implementation, as shown in FIG. 3, the barrier layers 31 are disposed on the surface of the insulated separator 3 facing the positive sheet 1 and the surface of the insulated separator 3 facing the negative sheet 2. The lithium-ions detaching from the positive sheet 1 will be blocked by the barrier layer 31 before passing through the insulated separator 3, so that the lithium-ions cannot enter the tab connection area 24 through the barrier layer 31. Barrier layer 31 is disposed between positive sheet 1 and insulated separator 3 and between negative sheet 2 and insulated separator 3. The lithium-ions can be better prevented from entering the tab connection area 24, so that it can prevent lithium-ions from metal lithium plating on the surface of negative base layer 21 of tab connection area 24, which may lead to safety accidents caused by thermal runaway of lithium ion battery.

Specifically, the insulated separator 3 between the tab connection area 24 and the positive sheet 1 is provided with the barrier layer 31, its implementations include but are not limited to the following three possible implementations:

The first implementation is: bonding the barrier layer 31 to the surface of the insulated separator 3. For example, a first adhesive layer can be provided on the side of the barrier layer 31 facing the insulated separator 3, so as to bond the barrier layer 31 to the insulated separator 3 through the first adhesive layer. The barrier layer 31 can be bonded to the side of the insulated separator 3 facing the positive sheet 1, or can be bonded to the side of the insulated separator 3 facing the negative sheet 2, or the barrier layer 31 can be bonded to both sides of the insulated separator 3. The first adhesive layer can be a non-sticky hot melt adhesive layer at normal temperature, where the normal temperature refers to room temperature in a normal environment, that is, the hot melt adhesive layer does not have adhesiveness under a room temperature environment; the first adhesive layer can also be other adhesive layers that can bond the barrier layer 31 to the insulated separator 3, which will not be repeated here.

In specific implementation, during the process of cell winding, the barrier layer 31 is bonded to the insulated separator 3 at a position corresponding to the tab connection area 24, whether it is bonded to one side of the insulated separator 3 facing the positive sheet 1 or bonded to one side of the insulated separator 3 facing the negative sheet 2, or bonding the barrier layer 31 on both sides of the insulated separator 3, as long as the barrier layer 31 can cover the tab connection area 24 after the cell winding, thus it can prevent the lithium-ions from passing through the barrier layer 31 and entering into the tab connection area 24, thereby preventing the lithium-ions from metal lithium plating on the surface of the negative base layer 21 of the tab connection area 24, which may lead to safety accidents caused by thermal runaway of the lithium ion battery.

Furthermore, a second adhesive layer can be provided on the side of the barrier layer 31 facing away from the insulated separator 3, and the second adhesive layer can be a pressure-sensitive adhesive layer that can be swelled by the electrolyte, which swells when encountering electrolyte and disengages from the adhesive. The pressure-sensitive adhesive layer that can be swelled by the electrolyte can use epoxy, polyurethane, acrylic or rubber as the adhesive, so that the adhesive force of the pressure-sensitive adhesive layer that can be swelled by the electrolyte can be reduced to within 5% of the initial state after soaking in the electrolyte, that is, the initial adhesive force is 0.1 to 0.3 N/mm, and the adhesive force after immersion in the electrolyte is less than 0.015 N/mm, preferably 0.010 N/mm or less.

In a specific implementation, take the barrier layer 31 located between the positive sheet 1 and the insulated separator 3 as an example. During the process of cell winding, the side of the barrier layer 31 provided with the second adhesive layer, i.e., pressure-sensitive adhesive layer that can be swelled by the electrolyte, is attached to preset position of the positive sheet 1 for winding, where the preset position is the position on the positive sheet directly opposite to the tab connection area 24 after the cell winding is completed, that is, the barrier layer 31 attached to the preset position will cover the tab connection area 24 after the cell winding is completed, and the side of the barrier layer 31 provided with the first adhesive layer, that is, the non-sticky hot melt adhesive layer at room temperature, is in contact with the insulated separator 3; after the cell winding, hot-pressing treatment on the wound-type cell at 30° C.-90° C., the hot-pressing treatment will increase the viscosity of the first adhesive layer, that is, the non-sticky hot melt adhesive layer at room temperature, so that the first adhesive layer is bonded to the insulated separator 3; after the wound-type cell is encapsulated in a housing and injected with the electrolyte, the electrolyte will swell the second adhesive layer, that is, the pressure-sensitive adhesive layer that can be swelled by the electrolyte, and de-bond from the positive sheet 1, so that the barrier layer 31 is finally adhered to the insulated separator 3, and thus does not hinder performance of the positive sheet 1. Where, bonding the barrier layer 31 to the positive sheet 1 can better position the barrier layer 31 to ensure that the barrier layer 31 can more accurately cover the tab connection area 24 after the cell winding is completed; setting the first adhesive layer as a non-sticky the hot melt adhesive layer at room temperature can prevent the barrier layer 31 from sticking to a conveyor roller of a device during the process of cell winding, causing the adhesive layer to fall off or the sheet tearing, and it can also prevent the surface of the barrier layer 31 from adsorbing too much dust, which is not conducive to the safety performance of the battery.

The second implementation is: the barrier layer 31 can be attached to the surface of the insulated separator 3 by spraying. Specifically, the barrier layer 31 can be attached to the side of the insulated separator 3 facing the positive sheet 1 or facing the negative sheet 2, and the barrier layer 31 can be sprayed on both sides of insulated separator 3. The barrier layer formed by spraying can be a polypropylene layer, a polyethylene layer or other polymer layers, or a metal layer or other inorganic layers.

In addition, the barrier layer 31 can also be disposed on the surface of the insulated separator 3 in other ways. Alternatively, the barrier layer 31 can be disposed between the insulated separator 3 and the positive sheet 1 or between the insulated separator 3 and the negative sheet 2 according to actual needs.

In an implementation, material processed to form the barrier layer 31 may include polyester resin, and may also include other materials that can meet the requirements of the barrier layer 31 in this embodiment, which will not be repeated here.

A thickness of the barrier layer 31 in this embodiment can be set between 10 μm and 20 μm to ensure that the thickness of the barrier layer 31 will not adversely affect performance of the wound-type cell.

The third implementation is that the part of the insulated separator 3 covering the tab connection area 24 can be heated to form the barrier layer 31. Where, the insulated separator 3 is selected from polyethylene or polypropylene. After the heating treatment, the insulated separator 3 formed by the polyethylene or polypropylene can close pores of the insulated separator 3 through which lithium-ions pass, thus forming a barrier layer 31 that can prevent lithium-ions from passing through.

Where, the heating treatment on the part of the insulated separator 3 covering the tab connection area 24 can be contact heating, for example, a heating plate is used to directly contact the part of the insulated separator 3 covering the tab connection area 24 for heating so that the pores on the part of the insulated separator 3 covering the tab connection area 24 are closed; it can also be non-contact heating, for example, using infrared light to irradiate the part of the insulated separator 3 covering the tab connection area 24 to heat so that the pores on the part of the insulated separator 3 covering the tab connection area 24 are closed; the temperature for heating the part of the insulated separator 3 covering the tab connection area 24 can be 120° C.-250° C., and the heating duration can be $1s$-$5s$.

Further, the positive sheet 1 includes the positive base layer 11 and the positive coating 12, where the positive coating 12 covers the surface of the positive base layer 11, and the positive base layer 11 is provided with an uncoated area 13, and the uncoated area 13 is opposite to the tab connection area 24, therefore the positive sheet 1 opposite to the tab connection area 24 does not have any active material producing lithium-ions, thus it can prevent the lithium-ions from detaching from the positive sheet 1 opposite to the tab connection area 24 to enter the tab connection area 24, and from the metal lithium plating on the surface of the negative base layer 21 of the tab connection area 24, and thus it is helpful to prevent safety accidents caused by thermal runaway of the lithium ion battery, at the same time, is helpful to reduce the safety risks caused by the metal lithium plating in fast charging process of the lithium ion battery.

This embodiment also provides a preparation method of a wound-type cell, including:

providing a positive sheet, a barrier layer, a negative sheet and an insulated separator, where, the negative sheet includes a negative base layer, a negative coating and a negative tab set on surface of the negative base layer, the negative coating covers the surface of the negative base layer, the negative coating is provided with a tab connection area that avoids the negative tab, and the negative tab is located in the tab connection area. For example, the negative tab can be welded to the tab connection area.

Providing a first adhesive layer on one side of the barrier layer, where the first adhesive layer can be a non-sticky hot melt adhesive layer at room temperature, specifically, the first adhesive layer can be coated on the surface of the barrier layer or attached to the barrier layer or set on the surface of the barrier layer in other ways. Providing a second adhesive layer on the other side of the barrier layer, where the second adhesive layer can be a pressure-sensitive adhesive layer that can be swelled by the electrolyte, or other adhesive layers that can bond the barrier layer and the positive sheet together. Specifically, the second adhesive layer can be coated on the surface of the barrier layer, can also be attached to the surface of the barrier layer, or can be set on the surface of the barrier layer in other ways.

Bonding one side of the barrier layer with the second adhesive layer to a preset position of the positive sheet, where the preset position refers to the position on the positive sheet that is directly opposite to the tab connection area after the cell winding is completed, that is, the barrier layer attached to the preset position will cover the tab connection area after the cell winding is completed.

Stacking the insulated separator and the negative sheet sequentially on a side of the positive sheet where the barrier layer is bonded to, where the tab connection area on the negative sheet faces the insulated separator. At the same time, a side of the barrier layer provided with the first adhesive layer, i.e., non-sticky hot melt adhesive layer at room temperature, is in contact with the insulated separator, since the hot melt adhesive layer is non-sticky at room temperature, the barrier layer will not be bonded with the insulated separator, thus it can avoid adverse effects on the subsequent winding process.

A laminated structure formed by the positive sheet, insulated separator and negative sheet is wound to form a wound-type cell. At the same time, the barrier layer attached to the positive sheet can cover the tab connection area to prevent the lithium-ions from entering the tab connection area through the barrier layer.

Conducting hot-pressing treatment on the wound-type cell, where the hot-pressing treatment will increase the viscosity of the non-sticky hot-melt adhesive layer at room temperature in contact with the insulated separator, so that the side of the barrier layer provided with the hot-melt adhesive layer can be bonded to the insulated separator, so that the barrier layer can more reliably cover the tab connection area.

In specific implementation, bonding the barrier layer to the positive sheet can better position the barrier layer to ensure that the barrier layer can more accurately cover the tab connection area after the cell winding is completed; setting the side of the barrier layer in contact with the insulated separator as a non-sticky hot melt adhesive layer at room temperature can prevent the barrier layer adhered to the positive sheet from adhering to the conveyor roller of a device during the process of cell winding, causing the adhesive layer to fall off or the sheet tearing, and it can also prevent the surface of the barrier layer from adsorbing too much dust, which is not conducive to the safety performance of the battery.

Furthermore, setting the second adhesive layer as the pressure-sensitive adhesive layer that can be swelled by the electrolyte, that is, when the wound-type cell is encapsulated in a housing and the electrolyte is injected, the electrolyte will swell the pressure-sensitive adhesive layer that can be swelled by the electrolyte on the barrier layer and release from adhesion with the positive sheet, so that the barrier layer will eventually adhere to the insulated separator, and thus does not hinder the performance of the positive sheet.

Embodiment II

This embodiment provides a battery, the battery includes a housing and a wound-type cell.

The wound-type cell in this embodiment has the same structure as the wound-type cell provided in Embodiment II, and can bring about the same or similar technical effects, which will not be repeated here. For details, please refer to description of above embodiment.

Embodiment III

This embodiment provides an electronic product, and the electronic product includes a battery.

The battery in this embodiment has the same structure as the battery provided in Embodiment II and can bring about the same or similar technical effects, which will not be repeated here. For details, please refer to the description of the above embodiment.

In the description of the present disclosure, it should be understood that the terms "top", "bottom", "upper", "lower" (if present), etc. indicate the orientation or positional relationship based on the orientation or positional relationship shown in the drawings. This is only for the convenience of describing the present disclosure and simplifying the description, rather than indicating or implying that the apparatus or element referred to must have a specific orientation, be constructed and operated in a specific orientation, and therefore cannot be understood as a limitation of the present disclosure.

In the description of the present disclosure, it should be noted that the terms "installation", "connected" and "coupled" should be understood in a broad sense, unless otherwise clearly specified and limited. For example, they can be fixed or detachable connected or integrally connected; it can be a mechanical connection or an electrical connection; it can be directly connected or indirectly connected through an intermediate medium, and it can be the internal communication between two components. For those of ordinary skill in the art, the specific meaning of the above-mentioned terms in the present disclosure can be understood through specific situations.

The terms "first", "second", "third", "fourth", etc. (if any) in the description and claims and the above-mentioned drawings of the present application are used to distinguish similar objects, and need not be used to describe a specific order or sequence. It should be understood that the terms used in this way may be interchanged under appropriate circumstances, so that the embodiments of the present application described herein can be implemented for example in a sequence other than those illustrated or described herein.

Finally, it should be noted that the above embodiments are only used to illustrate the technical solutions of the present disclosure, but not to limit them; although the present disclosure has been described in detail with reference to the foregoing embodiments, those of ordinary skill in the art should understand: it is still possible to modify the technical solutions described in the foregoing embodiments, or equivalently replace some or all of the technical features; and these modifications or replacements do not make the essence of the corresponding technical solutions deviate from the range of technical solutions of the embodiments of the present disclosure.

What is claimed is:

1. A wound-type cell, comprising a positive sheet, a negative sheet, and an insulated separator located between the positive sheet and the negative sheet; wherein,
the negative sheet comprises a negative base layer, a negative coating, and a negative tab disposed on a surface of the negative base layer, wherein the negative coating covers the surface of the negative base layer, and the negative coating is provided with a tab connection area that avoids the negative tab, and the negative tab is located in the tab connection area;
the positive sheet comprises a positive base layer and a positive coating, wherein the positive coating covers a surface of the positive base layer; and
the insulated separator between the tab connection area and the positive sheet is provided with a barrier layer covering the tab connection area, the positive sheet opposite to the barrier layer is covered with the positive coating, the barrier layer is bonded to a surface of the insulated separator and the barrier layer is used to prevent lithium-ions detaching from the positive sheet opposite to the tab connection area from passing through the insulated separator to enter the tab connection area;

wherein the barrier layer is bonded to the insulated separator through a first adhesive layer, and the first adhesive layer is a non-sticky hot melt adhesive layer at room temperature;

wherein a second adhesive layer is provided on a side of the barrier layer facing away from the insulated separator, and the second adhesive layer is a pressure-sensitive adhesive layer that is capable of being swelled by electrolyte.

2. The wound-type cell according to claim 1, wherein the barrier layer comprises polyester resin; and/or, a thickness of the barrier layer is between 10 μm and 20 μm.

3. A battery, comprising a housing and a wound-type cell, wherein the wound-type cell comprises a positive sheet, a negative sheet, and an insulated separator located between the positive sheet and the negative sheet; wherein, the negative sheet comprises a negative base layer, a negative coating, and a negative tab disposed on a surface of the negative base layer, wherein the negative coating covers the surface of the negative base layer, and the negative coating is provided with a tab connection area that avoids the negative tab, and the negative tab is located in the tab connection area;

the positive sheet comprises a positive base layer and a positive coating, wherein the positive coating covers a surface of the positive base layer; and the insulated separator between the tab connection area and the positive sheet is provided with a barrier layer covering the tab connection area, the positive sheet opposite to the barrier layer is covered with the positive coating, the barrier layer is bonded to a surface of the insulated separator and the barrier layer prevent lithium-ions detaching from the positive sheet opposite to the tab connection area from passing through the insulated separator to enter the tab connection area;

wherein the barrier layer is bonded to the insulated separator through a first adhesive layer, and the first adhesive layer is a non-sticky hot melt adhesive layer at room temperature;

wherein a second adhesive layer is provided on a side of the barrier layer facing away from the insulated separator, and the second adhesive layer is a pressure-sensitive adhesive layer that is capable of being swelled by electrolyte.

4. The battery according to claim 3, wherein the barrier layer comprises polyester resin; and/or, a thickness of the barrier layer is between 10 μm and 20 μm.

5. An electronic product, comprising the battery of claim 3.

* * * * *